т

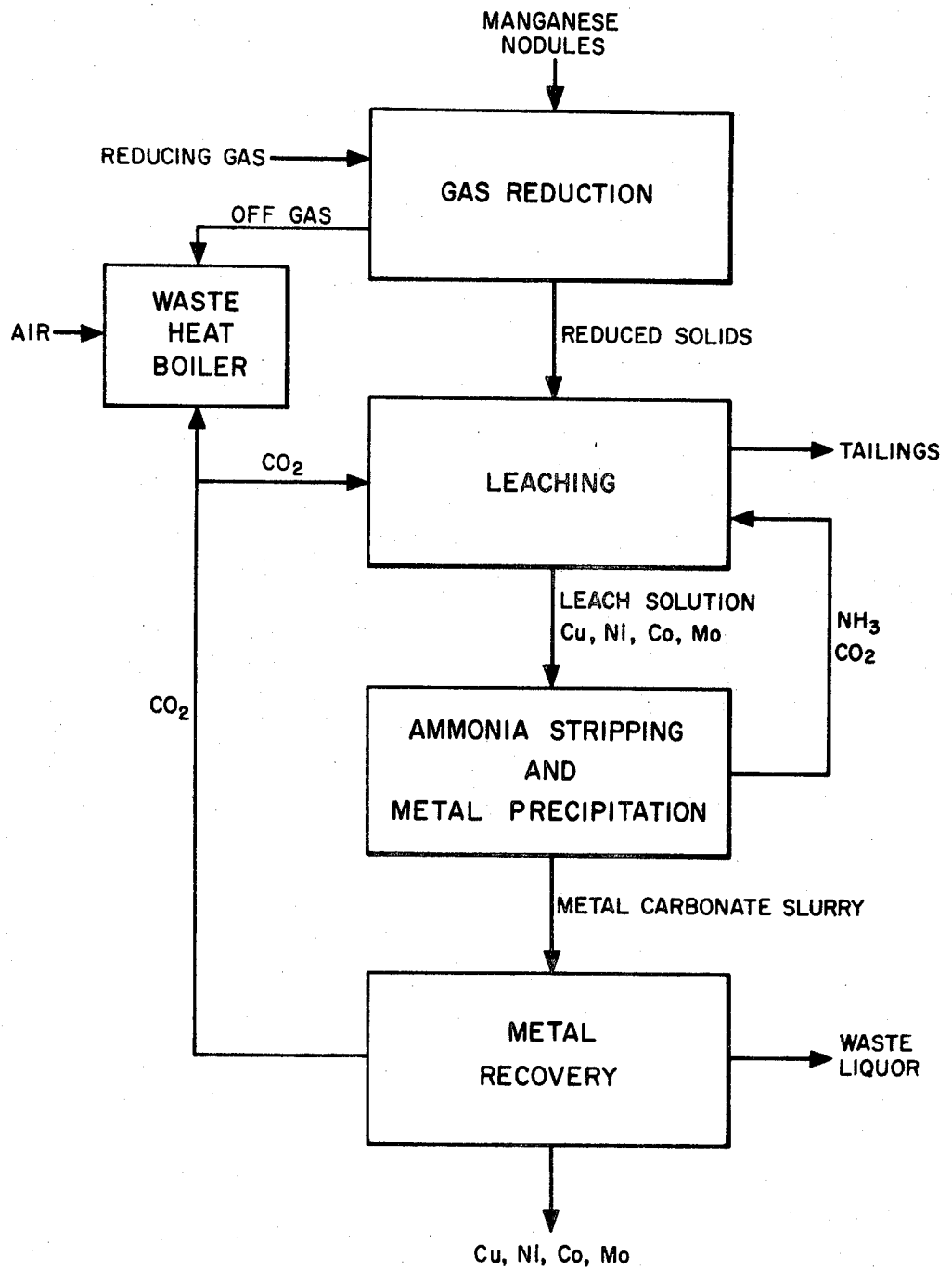

United States Patent Office 3,734,715
Patented May 22, 1973

3,734,715
EXTRACTION OF METAL VALUES FROM
COMPLEX ORES
Michael J. Redman, Belmont, Mass., assignor to
Kennecott Copper Corporation, New York, N.Y.
Filed July 16, 1970, Ser. No. 55,304
Int. Cl. C22b 3/00; C21b 1/02
U.S. Cl. 75—21                                    9 Claims

ABSTRACT OF THE DISCLOSURE

Copper, nickel, cobalt and molybdenum may be extracted from complex ores containing manganese, iron, copper, nickel, cobalt and molybdenum by subjecting the complex ore to gaseous reductants at temperatures in the range of 300 to 800° C. and leaching the reduced complex ore with a solution of an ammonium salt in aqueous ammonia.

BACKGROUND OF THE INVENTION

With the quantity and quality of the world's reserves of copper, nickel, cobalt and molybdenum rapidly diminishing the metallurgical industry is continually looking for better ways of increasing the recovery from present mineral sources and is vigilant in attempting to develop economically attractive processes to recover metal values from ores believed to be of little economic value. Pelagic sedimentary materials containing significant quantities of metal values have been known since late in the nineteeth century, however, no attempts have been made to recover the metal values therefrom. These pelagic sedimentary materials are considered to be complex ores which do not lend themselves to currently known extractive metallurgical processing techniques. Up to the present time these complex ores have only been found on the deep-sea floor of the oceans and lakes. Terrestrial ore beds containing manganese, iron, copper, nickel, molybdenum, cobalt and other metal values where the ore has physical characterization similar to ocean floor ores have not as yet been discovered. However, it is not unlikely that the same or similar type of complex ores will be located as terrestrial deposits. For the purpose of the remainder of this patent specification these complex ores will be variously referred to as deep sea nodules, deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered from the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The nodules invariably show an onionskin or concentric layer structure and are frequently oolitic within individual layers. However, the nodules have no overall crystalline structure. The literature tells us that the nodules consist of a number of intimately and randomly intergrown crystallites of many minerals among which are barite, rutile, anatase, goethite, and several apparently new minerals of manganese. Attempts have been made to characterize these new manganese minerals by X-ray diffraction, electron diffraction and electron probe investigation without much success. Copper and nickel ore are not present in the nodule in the usual form found in terrestrial ores. It has been postulated that copper and nickel are present in the nodule as a result of a substitution mechanism. It has not been possible heretofore to determine the best method of extracting the mineral values from the deep sea manganese nodules, particularly copper, nickel, cobalt and molybdenum.

The character and chemical content of the deep sea nodules may vary widely depending upon the region from which the nodules are obtained. For a detailed chemical analysis of nodules from the Pacific Ocean see pages 449 and 450 in The Encyclopedia of Oceanography, edited by R. W. Fairbridge, Reinhold Publishing Co., N.Y., 1966, and U.S. Pat. No. 3,169,856. For the purpose of this invention the complex ores will be considered as containing the following metal content range on a dry basis.

METAL CONTENT RANGE

|  | Percent |
|---|---|
| Copper | 0.8–1.8 |
| Nickel | 1.0–2.0 |
| Cobalt | 0.1–0.5 |
| Molybdenum | 0.03–0.1 |
| Manganese | 10.0–40.0 |
| Iron | 4.0–25.0 |

The remainder of the ore consists of clay minerals with lesser amounts of quartz, apatite, biotite and sodium and potassium feldspars. Of the many ingredients making up the manganese nodules, copper and nickel are emphasized because, from an economic standpoint, they are the most significant metals in most of the ocean floor ores. Cobalt and molybdenum may also be recovered by the process of this invention.

The mining of the vast reserves of manganese deep sea nodules lying over the ocean floor, can best be economically justified, were a more economical process available to effect separation and ultimate recovery of the copper and nickel elements. The recovery of molybdenum and cobalt from these complex ores is also of economic interest.

Accordingly, among the objects of this invention are to provide a novel and improved process for separating the copper and nickel from the complex ores or manganese deep sea nodules. Another object is to provide a novel and improved process for separating copper and nickel which process shall be simple and straightforward. Another object is to provide a novel and improved process for separating copper and nickel as found in manganese deep sea nodules, which process, at the same time facilitates the recovery of the cobalt and molybdenum elements contained in the nodules.

It is known, as is shown by Pat. No. 1,487,145 issued to M. H. Caron on Mar. 18, 1924, that nickel and cobalt-nickel ores may be first subjected to a reducing roast by producer gas, wood gas or any other suitable generator gas or reducing agent, either gaseous or solid. The reduction temperature depends on the ore treated and must be about 750° C. or higher. After reduction the roasted ore is cooled and treated with an ammoniacal ammonium salt solution. If the nickel and cobalt have been properly reduced they are readily soluble in the ammoniacal ammonium salt solution. From these solutions nickel and cobalt may be recovered in a pure form, for instance by distilling the volatile ammonium compounds off, leaving the metal as basic metal carbonate.

While the process of this invention is somewhat similar to the Caron Process critical differences appear. Firstly, the characteristics of the ores treated are significantly different. The ores treated by the Caron process have a low copper content and generally have a low manganese content. While it has not been possible to completely characterize the manganese nodules it has been possible to show that the copper and nickel mineralization in the nodules is extremely finely disseminated. Necessarily then any solid state reduction product or other product rendering copper and nickel leachable in an ammonium solution would also be finely disseminated. Such fine particle size greatly promotes chemical treatment of reactive material.

SUMMARY OF THE INVENTION

Comminuted complex ore containing manganese, iron, copper, nickel and cobalt as exemplified by deep sea manganese nodules are subjected to a reducing gas in the temperature range of about 300 to 800° C. After cooling the reduced nodules are leached with an aqueous solution containing an ammonium salt and ammonium hydroxide. The metal values are then recovered from the leach liquor by precipitation or evaporating the liquor.

DESCRIPTION OF PREFERRED EMBODIMENTS

The complex ores containing manganese, iron, copper, nickel, cobalt, molybdenum and minor amounts of other metal values are reduced with various gaseous reducing agents in the range of 300–800° C. and leached with an aqueous solution of an ammonium salt in ammonium hydroxide. It has been discovered that at the lower reduction temperatures, i.e. 300 to 400° C., the composition of the reducing gas has little effect upon the subsequent extraction of copper and of nickel. At the upper range of the reducing temperatures, i.e. above 500 to 800° C. a weakly reducing gas should be used to prevent the over-reduction of the iron. Over-reduction results in manganese and iron becoming soluble in the leach solution and may cause part of the otherwise recoverable copper and nickel to remain in the complex ore residue during the leaching step or to be redeposited in the complex ore residue during the separation of the copper and nickel rich leachate from the complex ore residue.

Complex ores as exemplified by deep sea manganese nodules were ground and split into size fractions. Experiments were run with the nodules ground to below 200 mesh and in the 20–45 mesh range. Usually the nodules were reduced without predrying but predrying in air up to 200° C. was not detrimental to metal recovery. The nodule samples were weighed into silica boats and placed inside a Vycor tube which was in turn placed in a tube furnace. Various gases were supplied from tanks, passed through flow meters, then over the samples and finally vented. After a known reduction time, the reduced nodules were allowed to cool in a non-reducing atmosphere such as carbon dioxide or nitrogen. Known weights of reduced nodules were then leached with known volumes of leach solution at various temperatures and with various degrees of aeration. Final leach solutions and leach residues were analyzed for the elements of interest (copper, nickel, cobalt, and molybdenum) using atomic absorption spectrometry.

Reducing gas mixtures used in the experimental tests included carbon monoxide-carbon dioxide mixtures, carbon monoxide-hydrogen mixtures and synthesis gas. Other reducing gases such as water gas or the combustion gas from controlled burning of fuel oil and natural gas may be used without departing from the scope of the invention. Synthesis gas compositions may range from about 3 to 18% hydrogen, 2 to 25% carbon monoxide, and 2 to 25% carbon dioxide with balance of the synthesis gas being nitrogen and water vapor.

EXAMPLE 1

Following the general procedure outlined above a mixture of 50 parts carbon dioxide and 20 parts carbon monoxide was used to pass over several nodule samples in a tube furnace. The reduction temperature varied from about 250° C. to a high of 900° C. while the reduction time remained at 6 hours for all samples. Four grams of nodules reduced at each of the temperatures shown below were leached in 100 ml. of leach solution for about 16 hours using an aqueous leaching solution containing 11% ammonia and 6.2% carbon dioxide. The leaching was done at room temperature with aeration. Table I shows results using this reducing gas at various reduction temperatures. It is apparent from the table that in the low temperature range, and particularly in the 350° C. range, high copper extraction (90+%) are obtained and the nickel extractions are well above 80%.

TABLE I.—GASEOUS REDUCTION AMMONIUM CARBONATE HYDROXIDE LEACHING

[Carbon monoxide (20 parts); carbon dioxide (50 parts) reduction mixture]

| Reduction temperature (° C.) | Reduction time (hours) | Leach time (hours) | Percent Cu extracted | Percent Ni extracted |
|---|---|---|---|---|
| 899 | 6 | 16 | 60.0 | 78.9 |
| 799 | 6 | 16 | 61.0 | 85.0 |
| 749 | 6 | 16 | 46.5 | 74.9 |
| 649 | 6 | 16 | 57.5 | 81.5 |
| 549 | 6 | 16 | 38.0 | 71.0 |
| 449 | 6 | 16 | 61.3 | 87.2 |
| 343 | 6 | 16 | 93.7 | 85.6 |
| 249 | 6 | 16 | 42.0 | 46.0 |

It is believed that at the lower reduction temperatures with the carbon monoxide-carbon dioxide gas mixtures that the iron present in the nodule samples is probably not reduced below $Fe_3O_4$.

EXAMPLE 2

Ground nodules were reduced for about 3 hours at 350° C. with a gas of composition $CO_2$ (50 parts)—CO (20 parts). The leach solution composition was 6.2% $CO_2$ as ammonium carbonate and 11% $NH_3$ in water. The leaching was done in contact with air at room temperature. Extractions are shown in Table II.

TABLE II

| Leach time | Percent Ni extracted | Percent Cu extracted |
|---|---|---|
| 6 minutes | 3.3 | 77.0 |
| 1 hour | 17.3 | 81.0 |
| 3 hours | 53.0 | 95.0 |
| 16 hours | 85.6 | 93.7 |
| 2 separate 16 hour leaches | 98.5 | 99+ |

Leaching the same reduced nodules at 65° C. for three hours resulted in an extraction of 95% copper and 80% nickel.

Further experiments were run using other carbon dioxide-carbon monoxide mixtures. As the carbon monoxide concentration of the gas was increased up to 75 parts carbon monoxide-25 parts carbon dioxide, the nickel extractions increased up to 88%, after a three hour leach at 65° C., while copper extractions remained essentially in the 90–99% recovery range.

EXAMPLE 3

Following the general procedure outlined above for reducing the complex ores a reduction was carried out with a reducing gas mixture of carbon monoxide and hydrogen. The gas mixture contained about 50 parts carbon monoxide and about 50 parts hydrogen. The reductions were done at 350° C. for as little as 7½ minutes up to about 1 hour. The reduced nodules were leached for the times as shown in Table III below with an aqueous ammonia-carbon dioxide leach solutions as shown. Table III shows the results in that with very short reduction times, at a low reduction temperature, significant quantities of copper, nickel, cobalt and molybdenum may be recovered from the complex ores.

TABLE III

[Leaching of nodules after CO/H₂ (1:1) reduction at 350° C.]

| | Percent extraction | | | |
|---|---|---|---|---|
| | Cu | Ni | Co | Mo |
| 20–45 mesh material: | | | | |
| (a) 7½ min. reduction, 1 hour leach at 60° C., 6.2% CO₂, 11% NH₃ leach solution | 97 | 88 | 27 | 67 |
| (b) ½ hour reduction, 1 hour leach at 60° C., 6.2% CO₂, 11% NH₃ leach solution | 94 | 89 | | |
| (c) ½ hour reduction, ½ hour leach at 60° C., with a 7% CO₂, 18% NH₃ leach solution | 97.5 | 92.5 | | |
| Less than 100 mesh material: | | | | |
| ½ hour reduction, 1 hour leach at 60° C. with 6.2% CO₂, 11% NH₃ leach solution | 98 | 82 | | |

EXAMPLE 4

Further gas reduction experiments were conducted using a synthesis gas reduction mixture. Synthesis gas in general is any mixture of carbon monoxide and hydrogen. The carbon monoxide and hydrogen may be in various proportions. Synthesis gas may be produced by high temperature action of steam on carbon or natural gas by the partial oxidation of natural gas or fuel oil or by other processes. Synthesis gas may also be referred to as water gas where a typical composition would be about 40% carbon monoxide; 50% hydrogen; 3% carbon dioxide and about 3% nitrogen.

Using a synthesis gas prepared by the partial oxidation of fuel oil and having a gas composition of about 1.5% carbon dioxide, 15% hydrogen, 24% carbon monoxide, with the balance being nitrogen, nodule samples were reduced at 350° C., 600° C. and 750° C. In experiments with reduction times as short as 15 minutes and with the synthesis gas containing up to 30% water vapor, good recoveries were obtained.

The extractions shown in Table IV were obtained using an aqueous leach solution composition oncataining 6.2% CO₂ as ammonium carbonate and 11% NH₃ after a 30 minute reduction.

Table IV below shows that reduction at 750° C. with a synthesis gas considered to be strongly reducing decreases the efficiency of the extractions. Diluting the synthesis gas with carbon dioxide to make the gas less strongly reducing results in higher recovery of copper and nickel at a reducing temperature of 750° C.

TABLE IV

| Nodule sample | Reduction temp. (° C.) | Leach conditions | Percentage extraction | | | |
|---|---|---|---|---|---|---|
| | | | Cu | Ni | Co | Mo |
| 1 | 350 | 1 hr. at 65° C. | 95.0 | 88.5 | 29.0 | 77.0 |
| 2 | 350 | do | 96.0 | 88.0 | 50.0 | 70.0 |
| 3 | 600 | 1 hr. at 65° C. followed by 1 hr. at room temperature. | 96.0 | 92.0 | 65.6 | 84.5 |
| 4 | 750 | 2 hrs. at room temperature. | 39.2 | 57.0 | 40.0 | 57.0 |
| 5 | 750 | do | 63.0 | 82.0 | 44.0 | 75.0 |
| 6 | *750 | do | 82.0 | 86.2 | | |

* 25 vol. percent CO₂ added to synthesis gas.

EXAMPLE 5

Manganese deep sea nodules were ground to a minus 60 mesh and reduced by passing a synthesis gas over them at reduction temperatures of 350° C., 600° C. and 750° C. The synthesis gas was prepared by the partial oxidation of fuel oil and had a gas composition of about 1.5% carbon dioxide, 15% hydrogen, 24% carbon monoxide with the balance being nitrogen. The nodules after reduction for one hour were allowed to cool in a nitrogen atmosphere to room temperature. The reduced nodules were then transferred and leached under a nitrogen atmosphere in a leach solution containing 6.2% carbon dioxide and 11% ammonia for 3 hours. The percentage extractions are shown in the tabulation below.

| Reduction temperature (° C.) | Percentage extraction | | | | |
|---|---|---|---|---|---|
| | Cu | Ni | Co | Mo | Zn |
| 350 | 94.1 | 92.2 | 53.2 | 94.6 | 77.4 |
| 600 | 88.2 | 90.6 | 71.7 | 83 | 41.2 |
| 750 | 88.1 | 84.6 | 75.7 | 88.4 | 20.8 |

Portions of the nodules from above were subjected to multiple leachings. Each separate leach was made with a fresh leach solution. The total leach time and the extractions obtained are indicated in the tabulation below.

| Reduction temperature (° C.) | Total leach time, hours | Percentage extraction | | | |
|---|---|---|---|---|---|
| | | Cu | Ni | Co | Mo |
| 350 | 64 | 98 | 91.5 | 54.8 | 93 |
| 600 | 102 | 98.2 | 95 | 79.7 | 88.2 |
| 750 | 102 | 96 | 92 | 77.2 | 84.6 |

The leach solutions obtained in most cases were low in iron and manganese content. In general the manganese content was about 0.03 gram per liter and the iron content was about 0.001 g./l. These figures show the selective nature of the novel process.

The drawing shows a flow diagram of a semi-continuous process for gas reduction using a synthesis gas or other gas reduction mixture.

Referring now to the drawing for a description of complete process for recovery of copper, nickel, cobalt and molybdenum from complex ores such as manganese deep sea nodules, nodules are crushed to an appropriate size and fed to a reduction step. The reduction may be done preferably in a fluidized bed. However, reduction may be also accomplished in a static bed of deep sea nodules where the reducing gas percolates upward or downward through the bed or on a traveling grate having the reducing gas passing over the nodules. The reducing gas may be synthesis gas, water gas, mixtures of carbon monoxide-carbon dioxide, mixtures of carbon monoxide-hydrogen, and gases made by controlled combustion of natural gas and fuel oils.

The nodules may be reduced in the reduction step at temperatures in the range from about 300 to 800° C. The temperature of reduction will depend upon the character of reducing gas used. Reduction is preferably controlled to prevent the formation of metallic iron that is soluble in the leaching solutions. By selecting the appropriate reducing gas and reduction temperatures the valuable metals, copper, nickel, cobalt and molybdenum, can be made to respond to a selective leaching procedure by minimizing the amount of iron capable of being solubilized. At lower reduction temperatures of from 300–600° C. reducing gas compositions such as those used in Examples 1, 2, 3 and 4 may be used. Since the temperatures are significantly lower only on insignificant amount of iron in the complex ore or nodules will be reduced to metal. Above 600° C. the reducing power of the gas should be lowered to prevent formation of large amounts of metallic iron. This can be achieved by the addition of a diluent such as carbon dioxide, water vapor, or other diluent to the reducing gas.

Once the complex ore or nodules have been reduced they are transferred to the leaching step. Leaching solutions are preferably an ammonium salt in aqueous ammonia. The concentration of the leach solution may range from about 0.05 to 2 molar ammonium salt and from about 5% to about 25% ammonia. The preferred ammonium salts are ammonium carbonate $(NH_4)_2CO_3 \cdot H_2O$, ammonium chloride $NH_4Cl$, and ammonium sulfate $(NH_4)_2SO_4$. Leaching may be done at ambient temperatures up to the temperature at which ammonia is expelled from the leach solution. Aeration of the leach slurry may be used to reduce the leaching time required. Aeration of the leach slurry assists in re-oxidizing the nickel and copper and thus solubilizes them. At the same time any of the manganese and/or iron that has been reduced to the soluble form will be re-oxidized into an insoluble form and be precipitated out of the copper and nickel rich leachate.

The leach liquor and residue or tailings are then separated in any convenient way such as decanting or filtration. The tailings may be discarded or further processed to recover the minerals remaining therein. The copper, nickel, cobalt and molybdenum rich leach liquor is fed to the stripping and precipitating step. Any convenient and economical means is used to raise the metal rich leach liquor to a temperature where ammonia gas and carbon dioxide are released from the liquor. As the ammonia and carbon dioxide leave the leach liquor the metal values precipitate as basic carbonates. The precipitated metal values are then pumped as a slurry to the metal recovery step. The metal values are recovered by known procedures.

It has been shown in this application that gaseous reduction of deep sea manganese nodules followed by ammoniacal leaching can be an effective process for the recovery of metal values. At low reduction temperatures, i.e. about 350° C., the effect of gas composition upon both the ultimate extraction and the rate of extraction is not so critical as it is at higher temperatures, i.e. about 750° C. when the influence of reduced iron upon copper recovery is apparent. It is clear that when the reducing gas composition is adjusted to prevent the formation of considerable amount of metallic iron, the high temperature reducing process can be used to recover not only copper and nickel but also most of the cobalt and molybdenum in the complex ore.

It should be understood that the invention is not based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims and in which it is our intention to claim all novelty inherent in the invention as broadly as is permissable in view of the prior art.

What is claimed is:

1. A method of extracting nickel, copper, cobalt and molybdenum from deep sea nodules wherein iron, manganese, copper, nickel, cobalt and molybdenum are present in the deep sea nodules as oxides or mixed oxides and said manganese is present as manganese dioxide consisting of the steps of
   (a) reducing the deep sea nodules with gaseous reducing agents in a temperature range of from about 300 to 500° C. whereby reduced deep sea nodules are produced containing substantially all the manganese in the manganous form and essentially free from metallic iron, and
   (b) leaching the reduced deep sea nodules with an aqueous leach solution of an ammonium salt and ammonia whereby the copper, nickel, cobalt and molybdenum are selectively removed from the deep sea nodules while the manganese and iron remain in the nodule residue.
   (c) separating a pregnant leach solution from the manganese and iron containing residue whereby the leach solution contains copper, nickel, cobalt and molybdenum and is substantially free from iron and manganese in solution, and
   (d) recovering the copper, nickel, cobalt and molybdenum from the pregnant leach solution.

2. The process of claim 1 wherein the reducing gas is selected from synthesis gas, carbon monoxide-carbon dioxide mixtures and carbon monoxide-hydrogen mixtures.

3. The process of claim 2 wherein the leach solution contains from about 0.5 to about 2.0 molar ammonium carbonate and from about 5% to about 25% ammonia.

4. The process of claim 3 wherein the synthesis gas has a composition of from about 3 to 18% hydrogen, from about 2 to 25% carbon monoxide and the balance a mixture of carbon dioxide, water vapor and nitrogen, the carbon monoxide-carbon dioxide mixture has a composition of from about 20 to 80 parts carbon monoxide and 20 to 50 parts carbon dioxide, and the carbon monoxide-hydrogen mixture has a composition from about 20 to 50 parts carbon monoxide and 20 to 50 parts hydrogen.

5. A method of extracting nickel, copper, cobalt and molybdenum from deep sea nodules wherein iron, manganese, copper, nickel, cobalt and molybdenum are present in the deep sea nodules as oxides or mixed oxides and said manganese is present as manganese dioxide consisting of the steps of
   (a) reducing the deep sea nodules in the presence of a diluted gas at temperatures of from about 500 to 800° C. whereby reduced deep sea nodules are produced containing substantially all the manganese in the manganous form and essentially free from metallic iron,
   (b) leaching the reduced deep sea nodule with an aqueous solution of an ammonium salt and ammonia whereby the copper, nickel, cobalt and molybdenum in the deep sea nodule is selectively liberated therefrom while substantially all of the iron and manganese remain in a nodule residue, and
   (c) separating a metal rich aqueous solution from the manganese and iron containing nodule residue.

6. The process of claim 5 wherein the reducing gas is selected from synthesis gas, carbon monoxide-carbon dioxide mixtures and carbon monoxide-hydrogen mixtures which has been diluted with carbon dioxide gas.

7. The process of claim 5 wherein the leach solution is ammonium carbonate in aqueous ammonia.

8. The process of claim 6 wherein the synthesis gas has a composition of from about 3 to 18% hydrogen, from about 2 to 25% carbon monoxide and the balance a mixture of carbon dioxide, water vapor and nitrogen, the carbon monoxide-carbon dioxide mixture has a composition of from about 20 to 80 parts carbon monoxide and 20 to 50 parts carbon dioxide, and the carbon monoxide-hydrogen mixture has a composition from about 20 to 50 parts carbon monoxide and 20 to 50 parts hydrogen and is diluted with about 25 volume percent of carbon dioxide.

9. The process of extracting copper and nickel from manganese nodules wherein iron, manganese copper, and nickel are present in the deep sea nodules as oxides or mixed oxides and said manganese is present as manganese dioxide consisting of the steps of
   (a) reducing pulverized manganese nodules at a temperature from about 300° C. to about 800° C. with a gaseous reducing agent prepared by the partial oxidation of fuel oil for a period of time from about six minutes up to about six hours whereby reduced deep sea nodules are produced containing substantially all the manganese in the manganous form and essentially free from metallic iron,
   (b) cooling the reduced manganese nodules in an inert atmosphere,
   (c) leaching the cooled reduced nodules with an aqueous solution containing from about 0.5 to about 2 molar ammonium carbonate and from about 5% to about 25% ammonia to selectively extract the copper and nickel from the cooled reduced nodules whereby a copper and nickel rich leach solution substantially free of iron and manganese in solution is prepared,
(d) separating the rich leach solution from a manganese and iron containing nodule residue,
(e) stripping the ammonia and carbon dioxide from the leach solution, and
(f) recovering copper and nickel from the stripped rich leach solution.

References Cited

UNITED STATES PATENTS

| | | | |
|---|---|---|---|
| 2,074,013 | 3/1937 | Bradley | 75—103 |
| 3,471,285 | 10/1969 | Rolf | 75—103 |
| 3,450,523 | 6/1969 | Socolescu | 75—7 |
| 3,169,856 | 2/1965 | Mero | 75—117 |
| 2,822,261 | 2/1958 | Mackiw | 75—103 |
| 2,363,315 | 11/1944 | Grothe | 75—103 |
| 2,608,463 | 8/1952 | Dean | 75—103 |
| 2,663,618 | 12/1953 | Babbitt | 75—103 |

L. DEWAYNE RUTLEDGE, Primary Examiner

P. D. ROSENBERG, Assistant Examiner

U.S. Cl. X.R.

75—7, 103, 117, 119